(12) United States Patent
Lowell

(10) Patent No.: US 12,309,530 B2
(45) Date of Patent: May 20, 2025

(54) DIGITAL LASER FILTER DEVICE

(71) Applicant: Seth Lowell, Macungie, PA (US)

(72) Inventor: Seth Lowell, Macungie, PA (US)

( * ) Notice: Subject to any disclaimer, the term of this patent is extended or adjusted under 35 U.S.C. 154(b) by 198 days.

(21) Appl. No.: 18/318,491

(22) Filed: May 16, 2023

(65) Prior Publication Data
US 2024/0385499 A1 Nov. 21, 2024

(51) Int. Cl.
| | | |
|---|---|---|
| H04N 7/18 | (2006.01) | |
| F41G 3/16 | (2006.01) | |
| F41G 11/00 | (2006.01) | |
| G02B 23/12 | (2006.01) | |

(52) U.S. Cl.
CPC ............... *H04N 7/18* (2013.01); *F41G 3/165* (2013.01); *F41G 11/00* (2013.01); *G02B 23/12* (2013.01)

(58) Field of Classification Search
None
See application file for complete search history.

(56) References Cited

U.S. PATENT DOCUMENTS

| | | | | |
|---|---|---|---|---|
| 3,983,634 | A * | 10/1976 | Erickson | F41G 11/00 42/129 |
| 4,311,364 | A * | 1/1982 | Motomura | G02B 7/006 359/827 |
| 4,378,146 | A * | 3/1983 | Suzuki | G03B 9/06 396/259 |
| 6,164,842 | A * | 12/2000 | Ohta | G03B 17/04 396/448 |
| 6,872,013 | B2 * | 3/2005 | Guy | G03B 7/10 396/510 |
| 6,904,688 | B1 * | 6/2005 | Henry | F41G 11/00 42/131 |
| 7,559,709 | B2 * | 7/2009 | Oh | H04N 23/55 396/510 |
| 8,950,102 | B1 * | 2/2015 | Reardon | F41G 1/54 42/120 |
| 9,470,908 | B1 * | 10/2016 | Frankel | G02C 5/124 |
| 10,359,257 | B2 | 7/2019 | Lowell | |
| 10,942,007 | B1 * | 3/2021 | Partney | F41G 3/165 |
| 2009/0038203 | A1 * | 2/2009 | McCarty | F41G 1/38 42/147 |
| 2011/0235001 | A1 * | 9/2011 | Matsumoto | G02B 7/10 359/740 |
| 2013/0100271 | A1 * | 4/2013 | Howes | A61B 3/135 348/E5.025 |

(Continued)

*Primary Examiner* — Stefan Gadomski

(57) ABSTRACT

A digital laser filter device allows the user to sight a target without possibility of another belligerent using a laser to damage the user's eye while peering through the firearm optics. The digital laser filter includes two configurations: an inline configuration, and an off-axis configuration. The inline configuration includes a digital camera, and an occlusion shield. The off-axis configuration further comprises a projection arm and an optic tube. The digital laser filter device is mounted to the scope or mounted on a firearm. The occlusion shield is used to establish a seal to the scope for protection against dust, and debris and to ensure the camera view is aligned with the firearm optics. The digital laser filter is also configured to color code the different laser wavelengths to gain information on lasers used and can be integrated with powered firearm mounting systems to link with information centers.

14 Claims, 18 Drawing Sheets

(56) References Cited

U.S. PATENT DOCUMENTS

| | | | |
|---|---|---|---|
| 2014/0212125 A1* | 7/2014 | Hsieh | G03B 17/14 396/533 |
| 2014/0230306 A1* | 8/2014 | Arachequesne | F41G 1/387 42/119 |
| 2015/0253112 A1* | 9/2015 | Piazza | F41G 3/06 42/111 |
| 2015/0338191 A1* | 11/2015 | Maryfield | G02B 23/16 345/633 |
| 2016/0116254 A1* | 4/2016 | Jahromi | F41G 11/00 42/122 |
| 2016/0290765 A1* | 10/2016 | Maryfield | F41G 1/30 |
| 2017/0017139 A1* | 1/2017 | Kilic | F41G 3/2605 |
| 2017/0328677 A1* | 11/2017 | Gull | G02B 27/0189 |
| 2018/0252500 A1* | 9/2018 | Maryfield | F41G 1/38 |
| 2019/0021578 A1* | 1/2019 | Hu | G02B 23/2469 |
| 2019/0316878 A1* | 10/2019 | Beckman | F41G 11/00 |
| 2020/0182580 A1* | 6/2020 | Williams | F41A 27/30 |
| 2020/0272044 A1* | 8/2020 | Walker | F41G 11/003 |
| 2020/0348104 A1* | 11/2020 | Chambers | H01M 50/247 |
| 2021/0010784 A1* | 1/2021 | Sheets, Jr. | G02B 27/34 |
| 2021/0108890 A1* | 4/2021 | Dentler | F41G 11/00 |
| 2021/0123707 A1* | 4/2021 | Baskett | H04N 23/661 |
| 2021/0223002 A1* | 7/2021 | Xiong | F41G 11/003 |
| 2021/0262758 A1* | 8/2021 | Parker | F41G 1/38 |
| 2022/0042773 A1* | 2/2022 | Kincel | F41C 27/00 |
| 2022/0283440 A1* | 9/2022 | VanBecelaere | F41G 1/473 |
| 2022/0325968 A1* | 10/2022 | Cabahug | F41G 11/003 |
| 2022/0341706 A1* | 10/2022 | Dwyer | F41G 11/003 |
| 2022/0381537 A1* | 12/2022 | Green | G02B 7/021 |
| 2023/0043709 A1* | 2/2023 | Maryfield | G02B 23/145 |
| 2023/0158969 A1* | 5/2023 | Dube | F16F 13/007 267/137 |
| 2023/0272999 A1* | 8/2023 | Campbell | F41G 1/32 89/41.05 |
| 2024/0185429 A1* | 6/2024 | Maier | G06T 7/337 |
| 2024/0369325 A1* | 11/2024 | Spuhr | F41G 11/003 |

* cited by examiner

DIGITAL LASER FILTER DEVICE

FIELD OF THE INVENTION

The present invention relates generally to gun safety accessories and more particular to a digital laser filter device that filter harmful lasers used for targeting for the purpose of injuring the eye of the shooter.

BACKGROUND OF THE INVENTION

As technology advances for warfare, the belligerents are looking to get the upper hand in the conflict. One method to achieve this is to use unconventional tactics to injure and remove an enemy combatant from the field of battle. As gun scopes increase in power and accuracy over long ranges, a sniper tries to maximize the distance from shooter's position to the target while still being able to effectively initiate contact with the target. In order to neutralize the snipers, the laser is being employed to injure the eyes of the snipers. If a high-powered laser makes direct contact with the eye, the eye will be damage and the shooter may become blind. The shooter also is required to carry laser range finders and ballistic computers to be able to accurately engage enemy positions.

An objective of the present invention is to provide shooters in combat with a laser filter. The laser filter completely solves laser threats, to injure the eye of the shooter. The laser acts as a sacrificial filter for a digital periscope to stop all lasers from ever reaching the optic or eye of shooter.

A further objective of the present invention is to provide an efficient filter that can have damaged components replaced easily and efficiently.

An objective of the present invention is to provide a digital laser filter device that also includes laser observation, and night vision capabilities but whose core is easily replaced if damaged.

An objective of the present invention is to provide a shield to excess light and dust and debris from infiltrating the optics. The occlusion shield of the present invention is made to attach to the scope of the firearm to shield excess light from infiltrating the optic from the lateral sides and degrading the visual image of the target. The occlusion shield also shields the optic from dust and debris from occluding the optic lens.

A further objective of the present invention is to provide a system that can integrate with power rail systems that can transmit sight pictures to a central command. The central command can then send commands that may show in display screen thereby eliminating the need to carry excess equipment such as laser range finders and ballistic computers allowing for faster response times to enemy combatants. The power rail system can also power the present invention longer than normal battery life.

Another objective of the present invention is to provide a laser filter device that may combine with the internal scope cap as disclosed in U.S. Pat. No. 10,359,257 B2, Issued Jul. 23, 2019 to Lowell.

DETAIL DESCRIPTIONS OF THE INVENTION

All illustrations of the drawings are for the purpose of describing selected versions of the present invention and are not intended to limit the scope of the present invention.

As used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

"First", "second" etc. as contained herein are terms used as labels for nouns that they precede and do not imply ordering unless context deems otherwise.

The present disclosure has broad utility and application. Any embodiment may incorporate only one of a plurality of the disclosed aspects of the present invention and may further incorporate only one or a plurality of the disclosed features of the present invention.

The present invention is a digital laser filter device 20. The present invention provides a device for filtering lasers pointed at a firearm optics 102 typically mounted on a firearm 100. This is not meant to be limiting in the use of the device but is an exemplary embodiment. The firearm optics 102 comprises a first filter-interfacing end, an eyepiece end and at least one optic lens. The firearm optics 102 may include a reticle etched on the at least one optic lens. The reticle gives a user a scale for assisting in targeting. An eye of the user can be placed up to the eyepiece end to peer through the firearm optics 102. The present invention includes two configurations: an off-axis configuration and an inline configuration. A first central axis runs longitudinally along the firearm optics 102 and parallels a first line of sight of the firearm optics 102.

In some exemplary embodiments, the firearm optics 102 may be a scope. In other embodiments the firearm optics 102 may be a red dot device.

Figure 1:
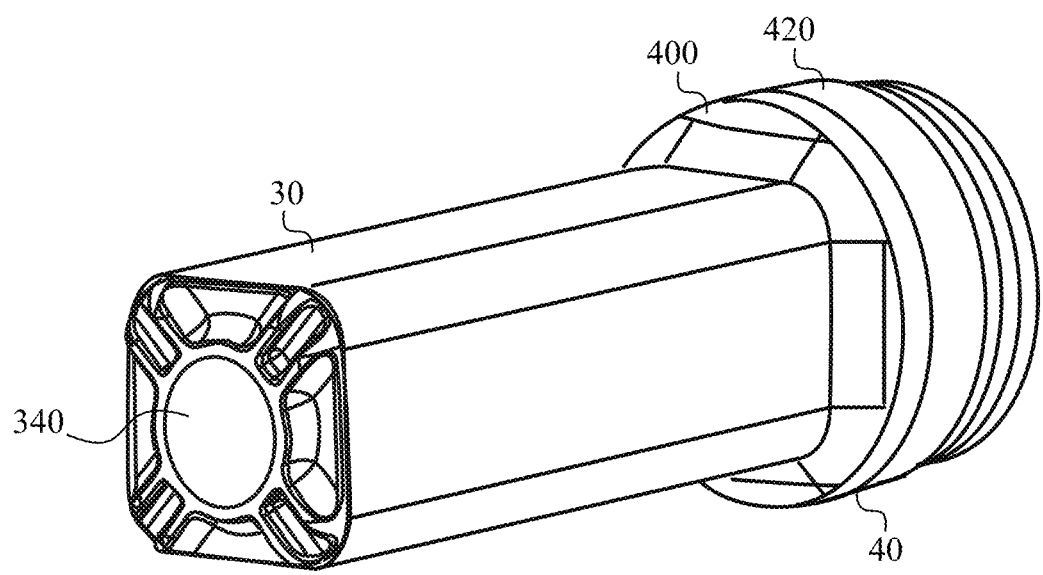
FIG. 1 is a top perspective view of the present invention, in accordance with some embodiments.
Figure 2:
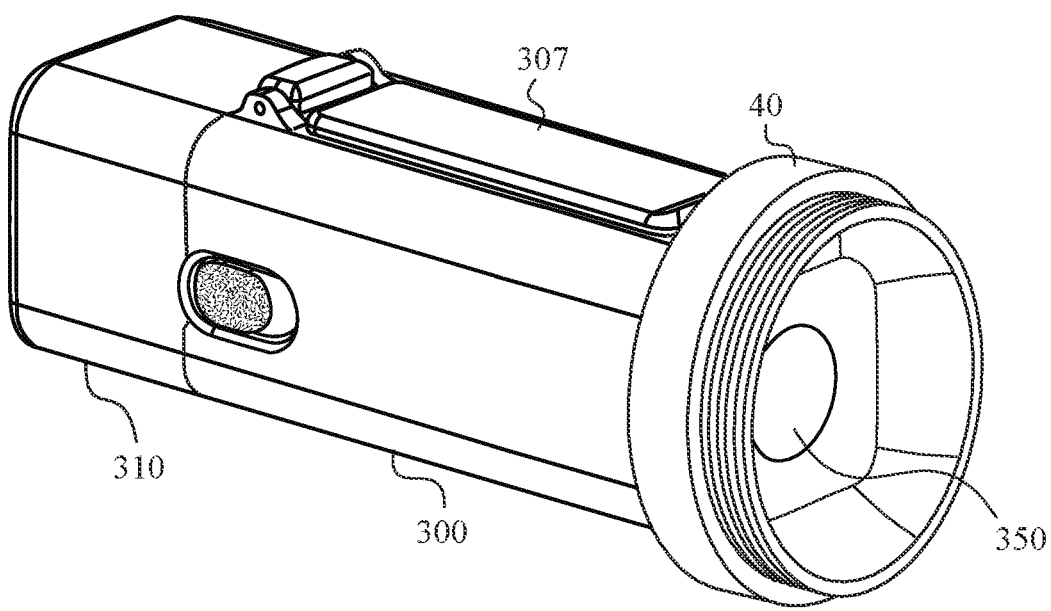
FIG. 2 is a top rear perspective view of the present invention, in accordance with some embodiments.
Figure 3:
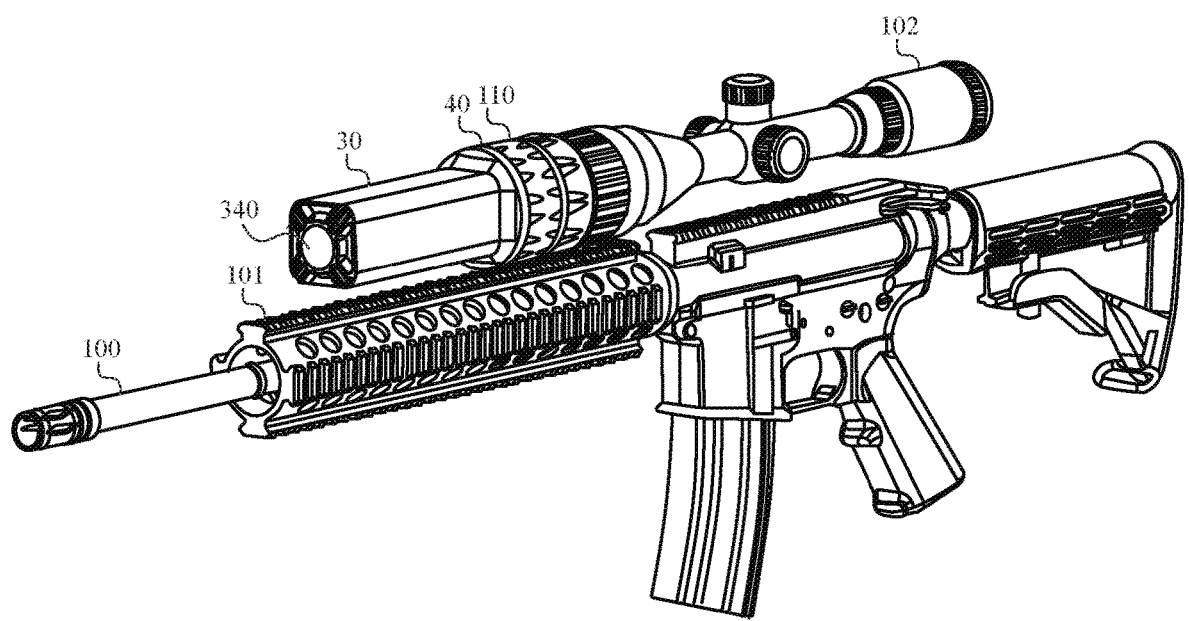
FIG. 3 is a top side view of the present invention in one configuration mounted to a firearm, in accordance with some embodiments.

In accordance with some embodiments as shown in FIG. 1 through FIG. 3, the inline configuration of the present invention may be mounted to the firearm optics 102 of the firearm 100. The present invention comprises a digital camera 30. The digital camera 30 includes a second central axis that runs along a second line of sight of the digital camera 30. In the inline configuration, the second central axis of the digital camera 30 is aligned with the first central axis of the scope. The user will put the user's eye up to the eyepiece end of the firearm optics 102 and peer through the firearm optics 102. The display screen 350 will project the digital image from the digital camera through the firearm optics 102 to the eye of the user. The present invention may be used with an internal scope cap as disclosed in U.S. Pat. No. 10,359,257 B2, Issued Jul. 23, 2019 to Lowell. The internal scope cap may be partially closed for further protection from lasers targeted at the user.

Figure 4:
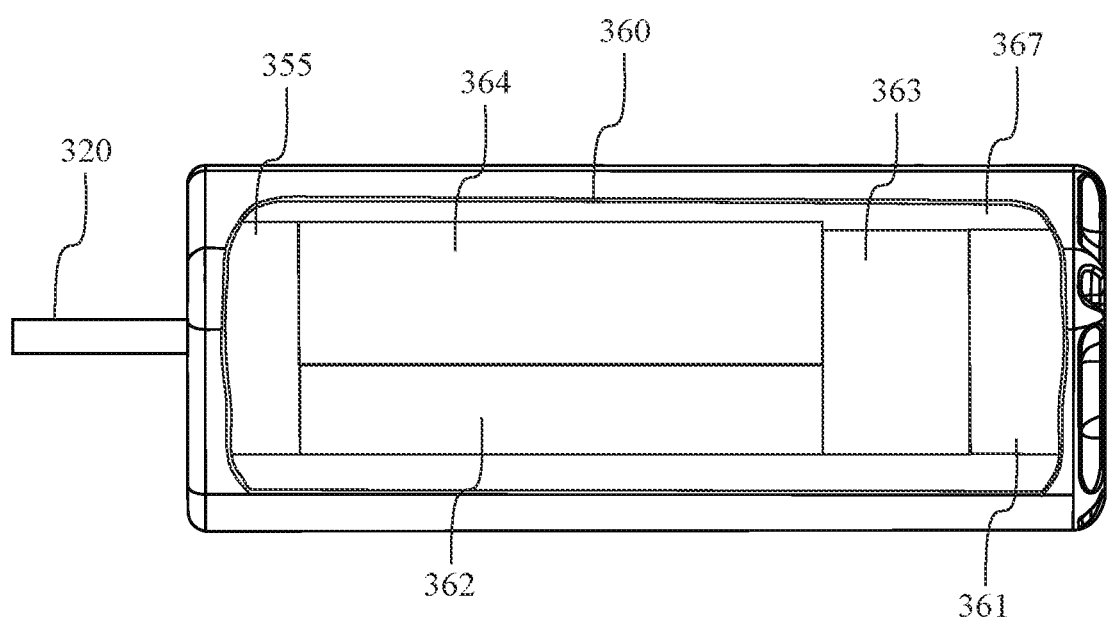
FIG. 4 is a partial right side view of the present invention, in accordance with some embodiments.
Figure 5:
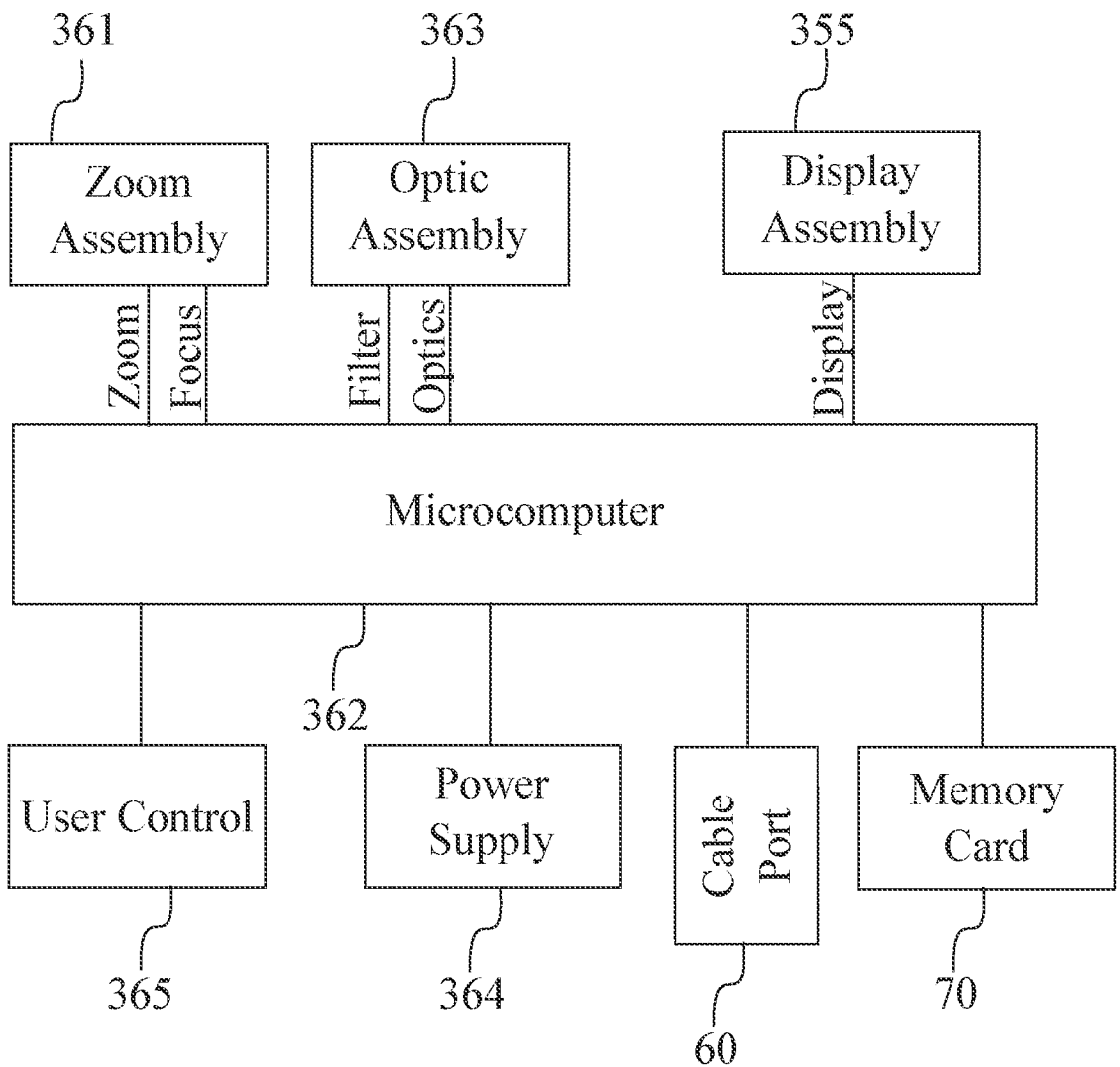
FIG. 5 is a block diagram of the present invention, in accordance with some embodiments.
Figure 6:
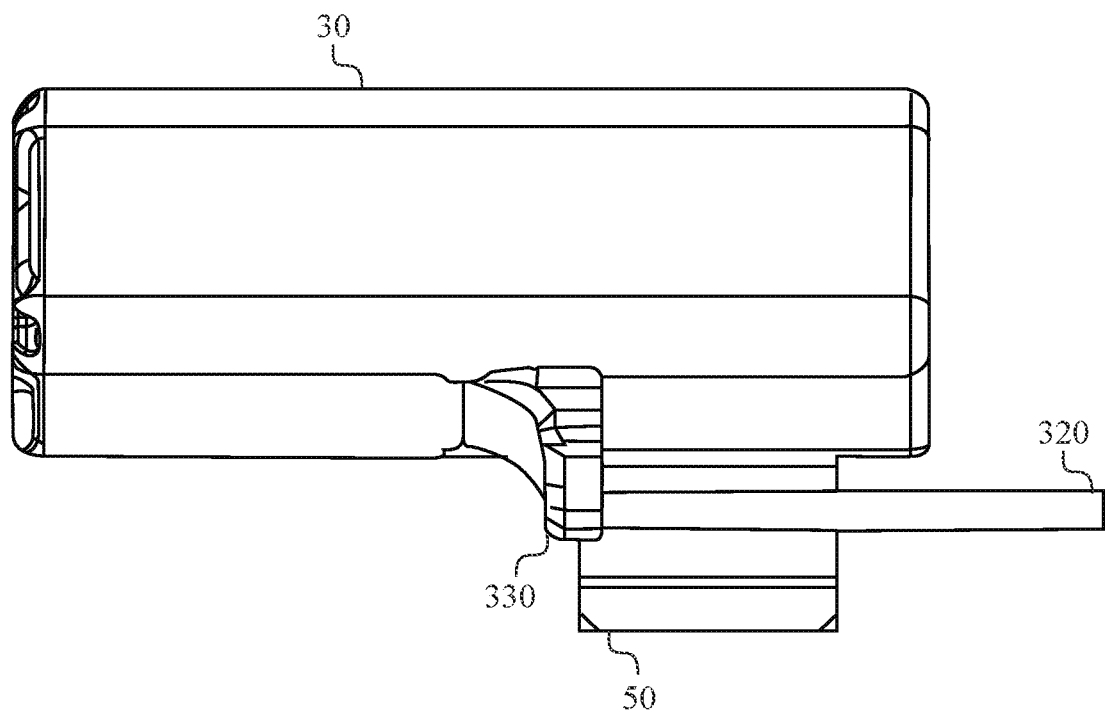
FIG. 6 is a top view of the present invention, in accordance with some embodiments.
Figure 7:
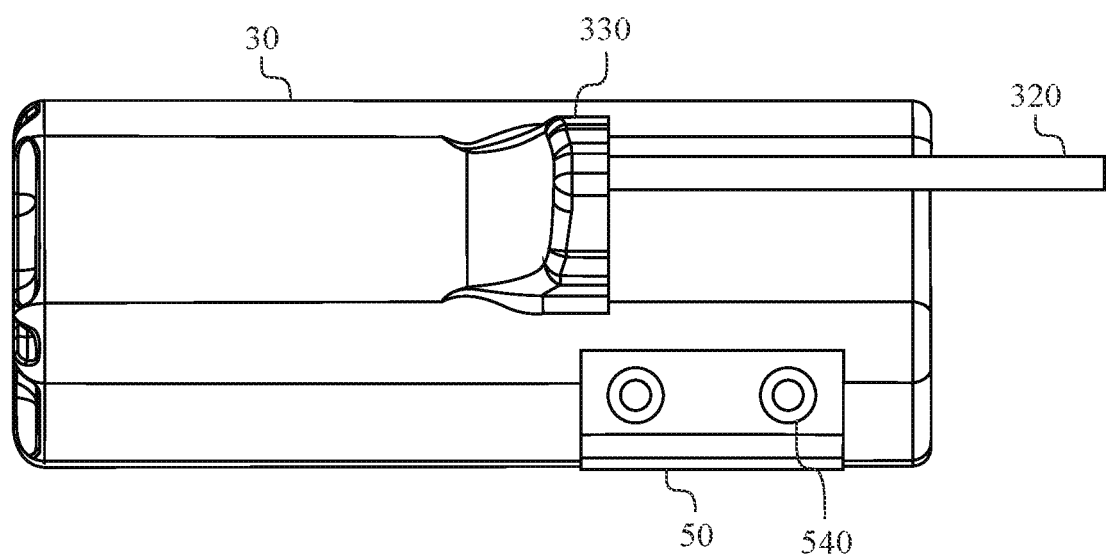
FIG. 7 is a left side view of the present invention, in accordance with some embodiments.
Figure 8:
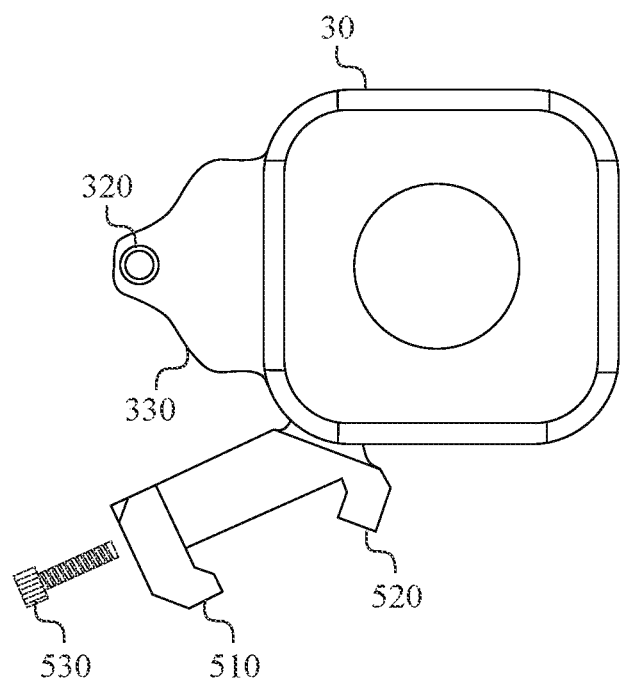
FIG. 8 is a rear view of the digital camera of the present invention, in accordance with some embodiments.

As shown in FIG. 4 and FIG. 5, the digital camera 30 of the present invention further comprises a housing 360, a microcomputer 362, a zoom assembly 361, an optics assembly 363, and a display assembly 355. The housing 360 defines a housing cavity 367. The microcomputer 362, the zoom assembly 361, the optics assembly 363, and the display assembly 355 all being disposed in the housing cavity 367. The zoom assembly 361 is coupled to the optics assembly 363. The microcomputer 362 is positioned next to the zoom assembly 361, the optics assembly 363, and the display assembly 355. The microcomputer 362 is coupled to the zoom assembly 361, the optics assembly 363, and the display assembly 355. The microcomputer 362 comprises a printed circuit board with functional electronics. The functional electronics controls some or all of the preceding components. Some or all of the preceding components and the housing 360 may be coupled together using screws, rivets, solder, and the like. The digital camera 30 includes a lens side and a display side. The lens side includes a lens opening and the display side includes a display opening. The optics assembly 363 comprises optic sensors, a filter system, and a camera lens 340. The lens opening securely receives the camera lens 340. The camera lens 340 focuses light and energy from a target image. The camera lens 340 defines an input optical aperture. The zoom assembly 361 can variably focus the light and energy further with magnifying capabilities. The filter system organizes light and energy according to the filter type. The filter system can detect the light and the energy wavelengths. The wavelength signals can be assigned a color-code. The optic assembly collects imaging signals from the light and the energy that passes through the camera lens 340 and the filter system. The optics assembly 363 can be configured for low-light setting, thermal, vibration detection, x-ray skeleton, vital organ placement and the like without limit. The microcomputer 362 has digital signal processing capabilities which processes the imaging signals and outputs processed digital signals. The display assembly 355 comprises a display screen 350. The display opening securely receives the display screen 350. The display assembly 355 displays the processed digital signals on the display screen 350. The display screen 350 can display the color-coded light recognition, wind direction pattern and speed, range finding, electromagnetic force (EMF) field detection, radio frequency, and the like without limit. The digital camera 30 further comprises an internal power supply system 364. The internal power supply system 364 may include a plurality of replaceable batteries, or a rechargeable battery or the like. The internal power supply system 364 is coupled with the microcomputer 362. The digital camera 30 may also include, in some embodiments, a power supply port for connecting to an external power supply. The digital camera further comprises a user control panel 365.

In an exemplary embodiment, the zoom assembly 361 is a 6×36 power magnified lens assembly that can be coupled to the controls of magnification of the firearm optics 102. The optics assembly 363 is preferably a low-light image sensor but is not limited to this. The display assembly 355 is preferably a liquid crystal display (LCD).

The microcomputer 362 provides zoom, filter, focus, and display controls to the zoom assembly 361, the optics assembly 363, and the display assembly 355. The microcomputer receives input signals from some or all of the preceding components as well as the user control panel 365. The user control panel 365 may include manual zoom controls such as a 2-way rocker switch for increasing and decreasing the magnification with an up-down motion respectively, and an on/off power switch. The buttons could be set into the housing 360.

The present invention may further comprise an occlusion shield 40 as shown in FIG. 1 and FIG. 2. The occlusion shield 40 comprises a coupling tube 420 and a circular base 400. The coupling tube 420 is perimetrically connected to the circular base 400. The circular base 400 is connected to the display side of the digital camera 30. The circular base 400 may be integral to the digital camera 30 but is not limited to this. The coupling tube 420 comprises an optic-interfacing end. The coupling tube 420 couples the digital camera 30 to the firearm optics 102. The optic interfacing end is placed within the first filter-interfacing end of the firearm optics 102. The coupling tube 420, in some embodiments, may include spiral thread on an outer surface of the coupling tube 420. The first filter-interfacing end of the firearm optics 102 may include female threads that rotatably receives the coupling tube 420. In other embodiments, the outer surface of the optic-interfacing end may include a first portion of an interlocking lip. The first filter-interfacing end of the firearm optics 102 may include a second portion of the interlocking lip that engages with the first portion of the interlocking lip to secure the present invention to the firearm optics 102.

In accordance with some embodiments as shown in FIG. 1, FIG. 2, and FIG. 6 through FIG. 10, the digital laser filter device 20 further comprises an optic tube 320. The optic tube 320 further transmits the image from the digital camera 30 to the eye of the user or to a second display screen that can be mounted behind the firearm optics 102 and closer to the user. The optic tube 320 is an optic cable configured for the transmission of digital information.

As shown in FIG. 6 through FIG. 10, the digital camera 30 further comprises a projection arm 330. The projection arm 330 extends out from the housing 360. The projection arm 330 operably receives the optic tube 320 and can transmit the digital information from the digital camera 30 to the optic tube 320. The projection arm 330 may be integral with the housing 360 of the digital camera 30.

In accordance with some embodiments as shown in FIG. 6 through FIG. 10, the present invention may include a firearm mount 50. The firearm mount 50 is attached to the digital camera 30. The firearm mount 50 may be integral with the digital camera 30 or can be fastened with fasteners such as screws, bolts, rivets or the like. In some embodiments, the firearm 100 includes a mounting system 101 such as a picatinny rail. The firearm mount 50 comprises a first clamping member 510, a second clamping member 520, and a clamping bolt 530. The first clamping member 510, the second clamping member 520, and the clamping bolt 530 are configured to removably clamp to the mounting system 101. The first clamping member 510, the second clamping member 520, and the clamping bolt 530 are operably configured with the first clamping member 510 being secured to the second clamping member 520 via the clamping bolt 530. As the clamping bolt 530 is rotatably tightened, the first clamping member 510 and second clamping member 520 are engaged in a clamping action. The firearm mount 50 can be configured to function with a powered mounting system 101. A firearm mount further comprises a plurality of rail contacts 550 is preferably positioned on a bottom side of the firearm mount. The plurality of rail contacts 550 aligns with a plurality of mount contacts positioned on the powered mounting system 101 that is attached to the firearm 100. The plurality of rail contacts 550 are electrically wired to the internal power supply system 364. The plurality of rail contact is coupled to the microcomputer 362 of the digital camera. The plurality of mount contacts is electrically wired to a centralized external power supply that can power the optics and sensors. The digital camera 30 can also transmit the digital images and information to the powered mounting system 101, which in turn can transmit the digital images and information to a central command. The central command can in turn transmit digital images and information to the powered mounting system 101 which then transmits to the digital camera 30 which then can display the digital images and information on the display screen 350. In some embodiments, the digital camera 30 further includes a wireless communications assembly. The wireless communications assembly comprises a transceiver and an antenna. The powered mounting system 101 may transmit the digital images and information to the digital camera 30 via wireless communication and vice versa.

Figure 9:
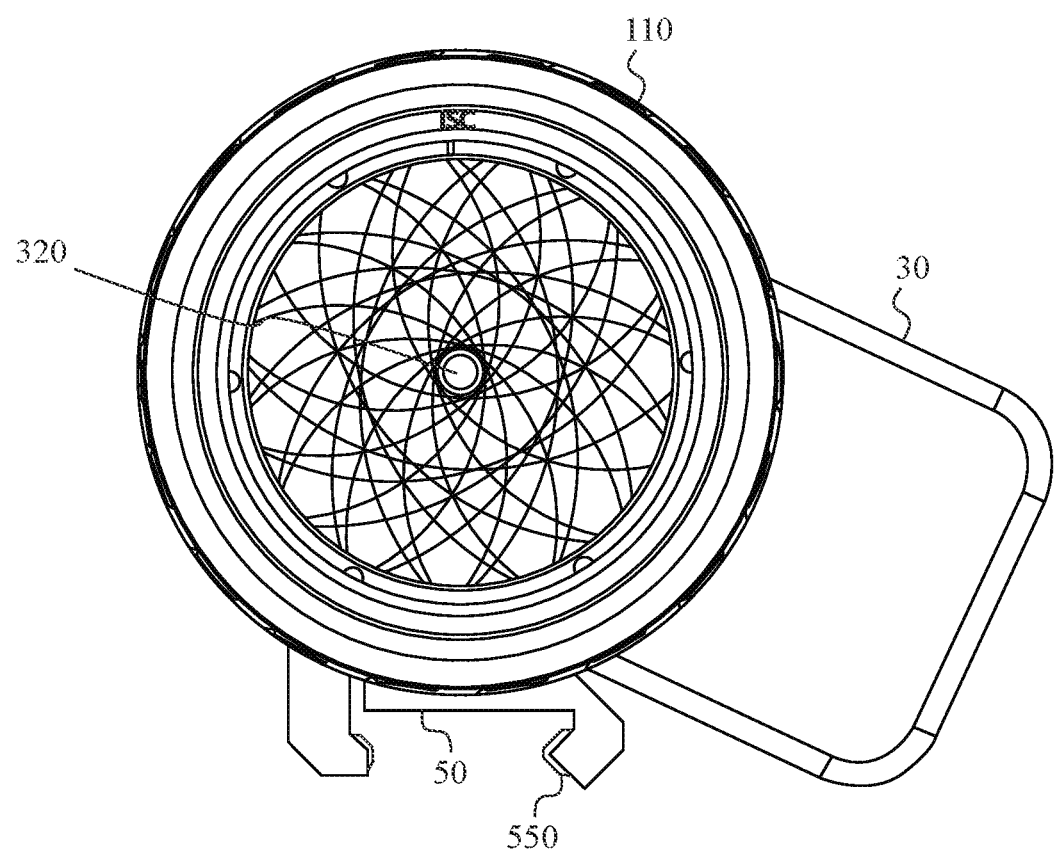
FIG. 9 is a rear view of the present invention through the internal scope cap, in accordance with some embodiments.

FIG. 9 is a view of the rear of the present invention through the internal scope cap 110. The present invention may be used with the internal scope cap 110. The internal scope cap 110 can be attached to the firearm optics 102 of the firearm 100. The present invention can then be removably connected to the internal scope cap 110. The internal scope cap 110 comprises an iris diaphragm, and a scope mount. The iris diaphragm comprises an attachment tube, a plurality of iris blades, an annular base, and a blade actuator. The attachment tube is perimetrically connected to the annular base. The annular base supports the plurality of iris blades. The blade actuator is rotatably connected to the annular base. The plurality of iris blades forms an iris opening. The plurality of iris blades is equally spaced around the attachment tube so that the plurality of iris blades completely converges towards the center of the iris opening. The blade actuator is used to move the iris blades from an open position to a partially closed or a fully closed position. The internal scope cap 110 may be attached to the firearm optics 102 via the scope mount. The center of the iris opening can be configured to be aligned with the first central axis. The internal scope cap 110 may include a protective lens. The protective lens refracts incidental light thereby reducing glint and glare. The protective lens helps reduce the strain on the user's eye and allows the user to better see the target. The protective lens is pressed between the scope mount and the iris diaphragm. In some other embodiments, the internal scope cap 110 may further comprise a glare-reduction lattice. The glare-reduction lattice reflects incidental light from the user's eye. The glare-reduction lattice is adjacently connected to the blade actuator. The internal scope cap 110 protects the firearm optics 102, in particular, an optic lens of the firearm optics 102. The internal scope cap 110 includes a second filter-interfacing end. The second filter-interfacing end may receive the optic-interfacing end of the present invention. The optic-interfacing end is secured to the second filter-interfacing end of the internal scope cap 110.

In accordance with some embodiments, the inline configuration may include the optic tube 320 configured with the digital camera 30 to operably connect into the display side of the digital camera 30. The optic tube 320 in the inline configuration is aligned with the first central axis with the present invention attached to the filter-interfacing end of the firearm optics 102. In either configuration, the user will put the user's eye up to the eyepiece end of the firearm optics 102 and peer through the firearm optics 102. The optic tube 320 will project the digital image from the digital camera through the firearm optics 102 to the eye of the user. The internal scope cap may be partially closed around the optic tube 320 for further protection from lasers targeted at the user. The glare reducing lattice and the protective lens of the internal scope cap 110 adds further protection from lasers and the like. If the present invention fails, the user could remove the present invention from the line of sight and still have the working internal scope cap 110 for protection with glare-reducing lattice, and the protection lens in addition to the iris diaphragm.

Figure 10:
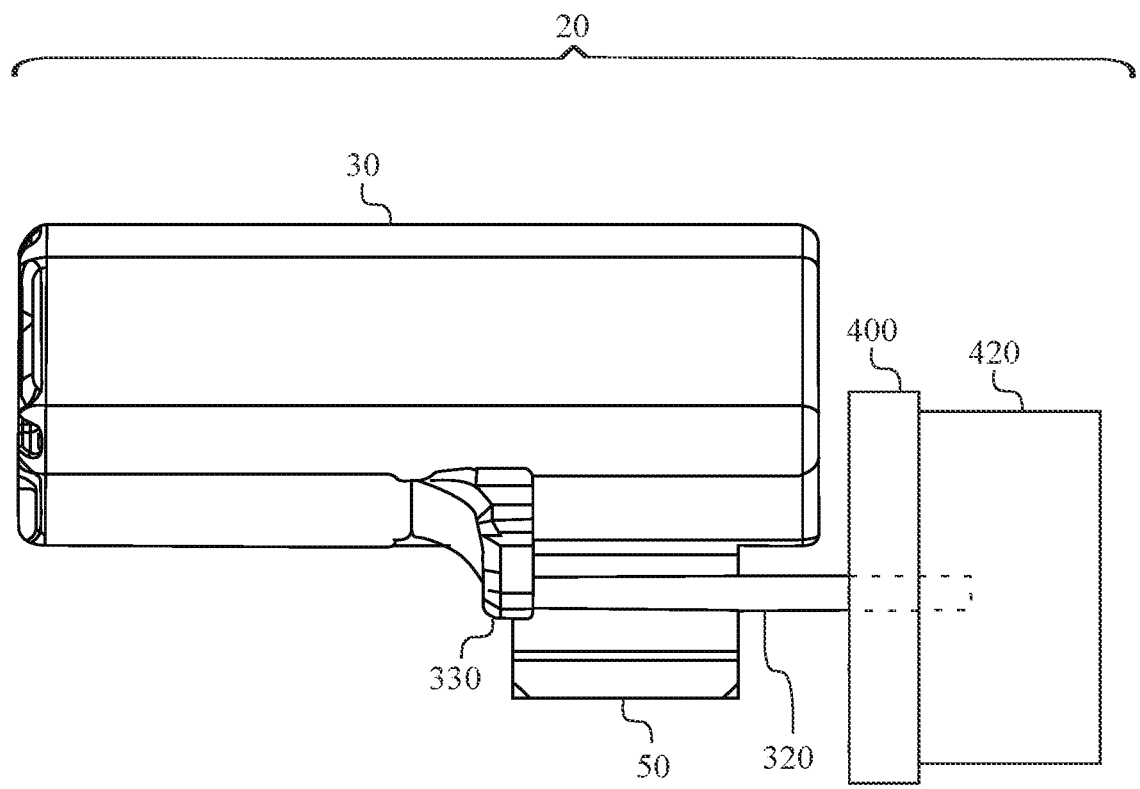
FIG. 10 is a left side view of the present invention, in accordance with some embodiments.
Figure 11:
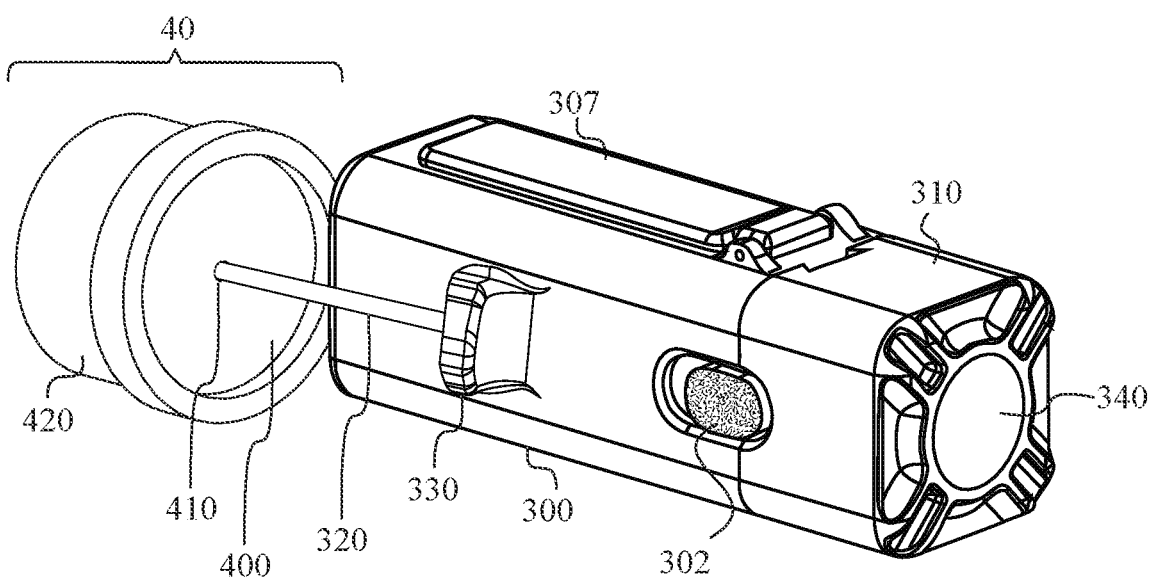
FIG. 11 is a top front perspective view of the present invention, in accordance with some embodiments.
Figure 12:
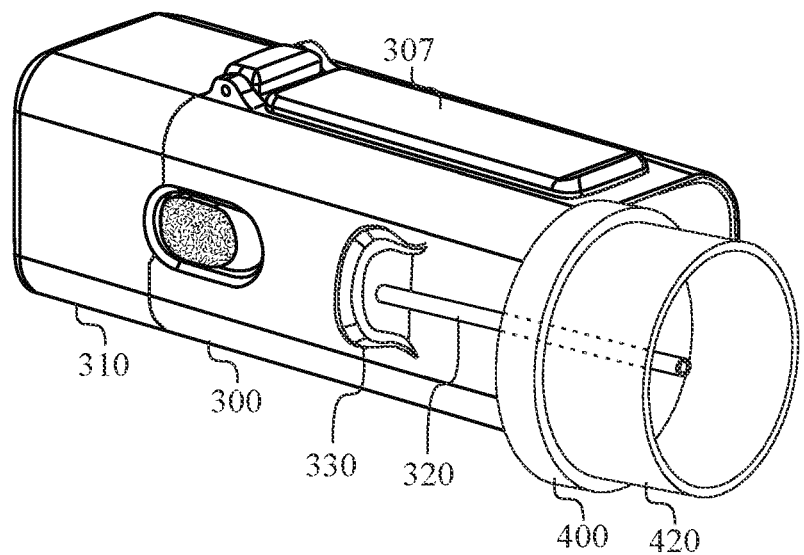
FIG. 12 is a top rear perspective view of the present invention, in accordance with some embodiments.

As shown in FIG. 10 through FIG. 12, the occlusion shield 40 further comprises an optic tube hole 410. The optic tube hole 410 is preferably positioned centrally on the circular base 400. The optic tube hole 410 receives the optic tube 320. The occlusion shield 40 protects the filter-interfacing end from dust and debris as well as assists in aligning the optic tube 320 with the first central axis of the firearm optics 102 via the optic tube hole 410 after mounting the present invention in the off-axis configuration to the internal scope cap 110 or to the firearm optics 102.

Figure 13:
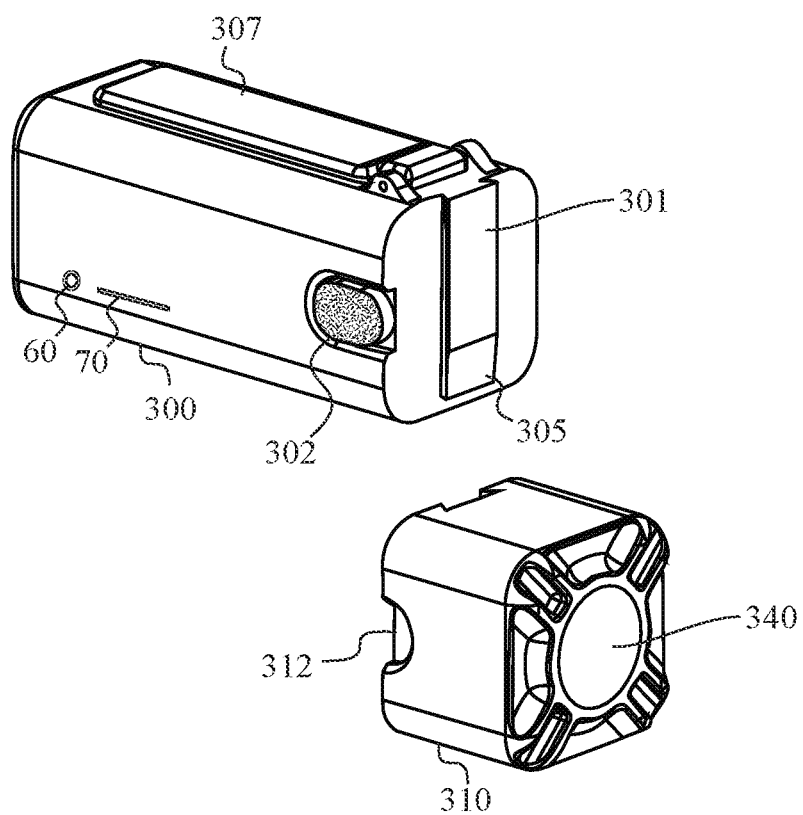
FIG. 13 is a top front perspective view of the digital camera of the present invention, in accordance with some embodiments.
Figure 14:
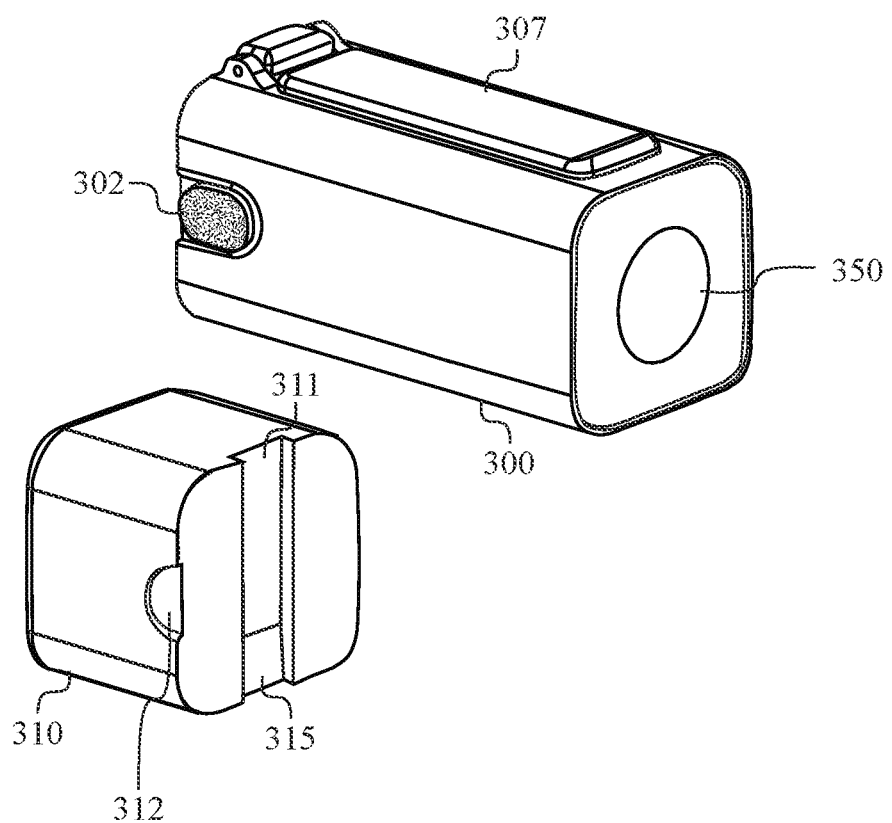
FIG. 14 is a top rear perspective view of the digital camera of the present invention, in accordance with some embodiments.
Figure 15:
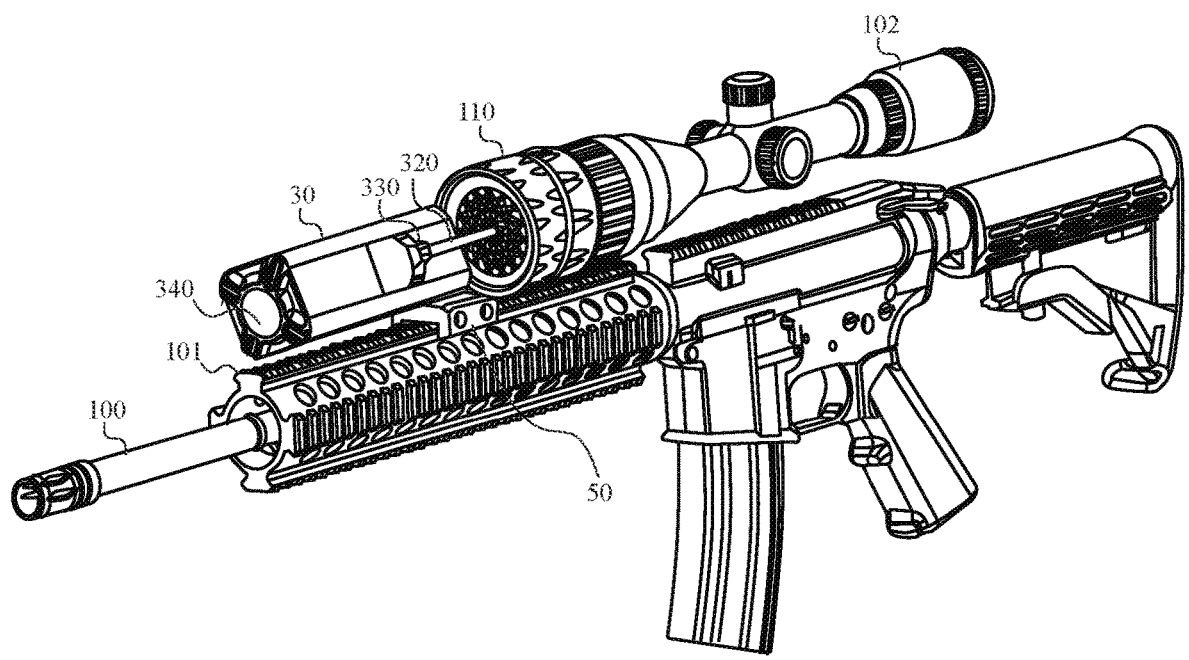
FIG. 15 is a top front perspective view of the present invention in one configuration mounted to a firearm, in accordance with some embodiments.
Figure 16:
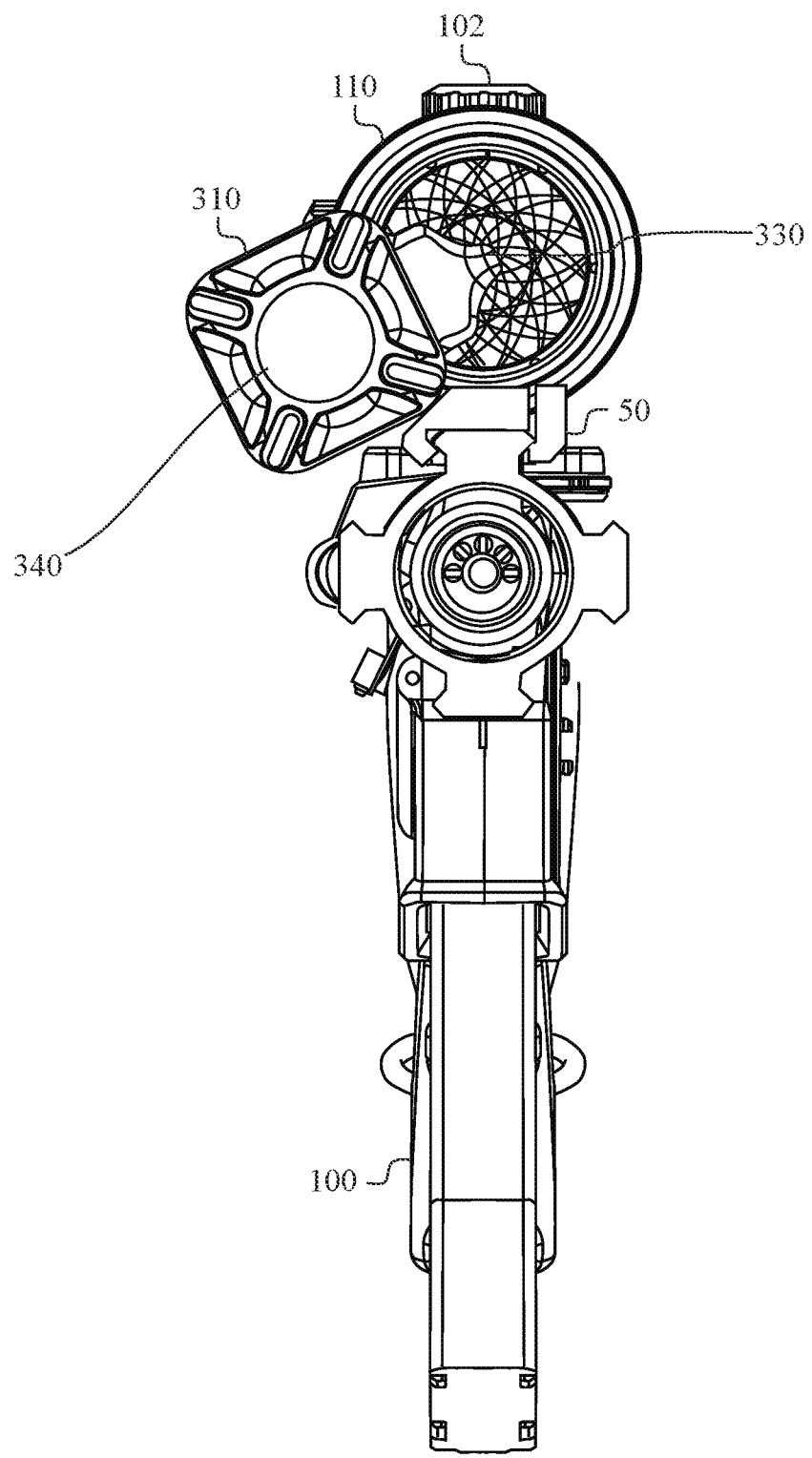
FIG. 16 is a front view of the present invention in one configuration mounted to a firearm, in accordance with some embodiments.
Figure 17:
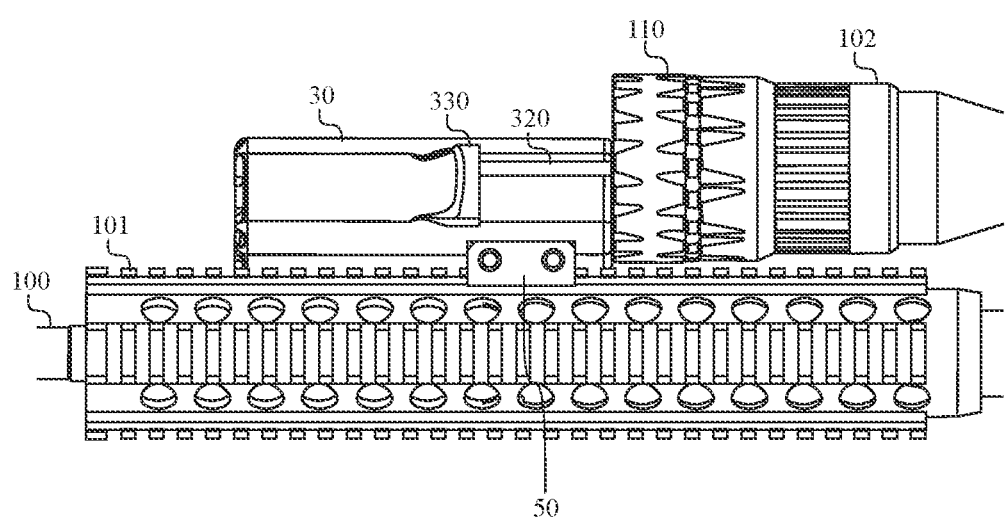
FIG. 17 is a left side view of the present invention in one configuration mounted to a firearm, in accordance with some embodiments.
Figure 18:
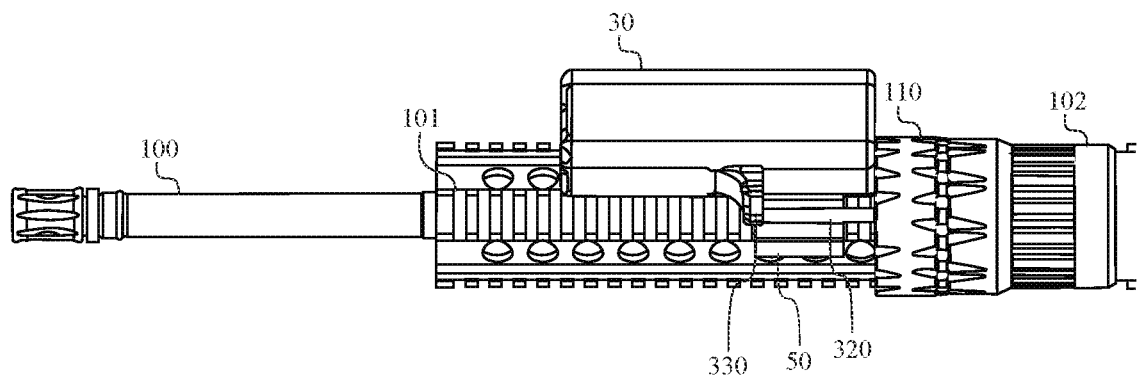
FIG. 18 is a top view of the present invention in one configuration mounted to a firearm, in accordance with some embodiments.

In accordance with some embodiments as shown in FIG. 13 and FIG. 14, the digital camera 30 further comprises a camera body portion 300 and a camera core portion 310. The camera core portion 310 houses the zoom assembly 361 and the optics assembly 363 but is not limited to this. The camera body portion 300 houses the microcomputer 362, the display assembly 355 and the internal power supply system 364 but is not limited to this. If the optics assembly 363 is damaged, the camera core portion 310 can be replaced easily with a replacement camera core. The camera core portion 310 being configured to be slidably detachable from the camera body portion 300. The camera body portion 300 further comprises an attachment ridge 301, at least one detachment button 302, and a first contact 305. The camera core portion 310 further comprises at least one attachment notch 312, an attachment groove 311, and a second contact 315. The attachment groove 311 slidably receives the attachment ridge 301 along an allowed length of travel. The first contact 305 and the second contact 315 are intimately engaged to allow the digital images and information to be transmitted from the first contact 305 to the second contact 315 and vice versa. One of the at least one detachment button 302 and one of the at least one attachment notch 312 are aligned when the first contact 305 and the second contact 315 are engaged. One of the at least one attachment notch 312 slidably receives one of the at least one detachment button 302 to operably secure the camera core portion 310 to the camera body portion 300. The digital camera 30 may further comprise an access port 307 for easier access to the internal components of the digital camera 30 for repair or replacement.

In accordance with some embodiments as shown in FIG. 13, the digital camera 30 further comprises a cable port 60 and a memory card port 70. The cable port 60 can be used to connect an end of a digital data cable to the digital camera 30 and the opposing end of the cable to a computer system for software updates and the like. The memory card port 70 can receive a memory card to download the digital images and information if the transmission can't be done by wireless connection. The cable port 60 is a mechanical connection for a cable. The cable port is disposed in the housing 360. The cable port is coupled with the microcomputer 362. The memory port 70 is a mechanical connection for a memory card. The memory port 70 is coupled with the microcomputer 362.

In accordance with some exemplary embodiments as shown in FIG. 15 through FIG. 18, the present invention in the off-axis configuration may be mounted to the firearm 100. The digital camera 30 of the present invention may be canted to a lateral side of the firearm 100 and away from the first central axis of the firearm optics 102. The user will put the user's eye up to the eyepiece end of the firearm optics 102 and peer through the firearm optics 102. The optic tube 320 will project the digital image from the digital camera through the firearm optics 102 to the eye of the user. The off-axis configuration allows for the user to use the firearm optics 102 for protection against laser threats from other belligerents.

Although the invention has been explained in relation to its preferred embodiment, it is to be understood that many other possible modifications and variations can be made without departing from the spirit and scope of the invention.

What is claimed is:

1. A digital laser filter device comprising:
a digital camera;
an occlusion shield;
an optic tube;
the digital camera comprising a housing, a zoom assembly, an optics assembly, a display assembly, a microcomputer, an internal power supply, a lens side, and a display side;
the optics assembly comprising a camera lens;
the display assembly comprising a display screen;
the lens side comprising a lens opening;
the display side comprising a display opening;
the housing defining a housing cavity;
the lens opening securely receiving the camera lens;
the display opening securely receiving the display screen;
the microcomputer, the zoom assembly, the optics assembly, and the display assembly all being disposed in the housing cavity;
the microcomputer, the zoom assembly, the optics assembly, and the display assembly, wherein some or all, being coupled together in the housing cavity;
the occlusion shield comprising a coupling tube, tube and a circular base;
the coupling tube being perimetrically connected to the circular base;
the circular base being attached to the display side of the digital camera;
the digital camera and the occlusion shield being configured in an inline configuration;
the optic tube being configured with the display assembly of the digital camera to operably connect into the display side of the digital camera; and
the optic tube being aligned in the inline configuration.

2. The digital laser filter device as claimed in claim 1 further comprising:
the digital camera comprising a camera body portion and a camera core portion;
the camera body portion comprising at least one detachment button, an attachment ridge, and a first contact;
the camera core portion comprising at least one locking notch, an attachment groove, and a second contact;
the camera core portion being configured to be slidably detachable from the camera body portion;
the attachment groove slidably receiving the attachment ridge;
the first contact and the second contact being intimately engaged;
one of the at least one detachment button and one of the at least one locking notch being aligned when the first contact and the second contact are engaged; and
one of the at least one locking notch slidably receiving one of the at least one detachment button to operably secure the camera core portion to the camera body portion.

3. The digital laser filter device as claimed in claim 1 further comprising:
a firearm mount;
the firearm mount being attached to the digital camera;
the firearm mount comprising a first clamping member, a second clamping member, and a clamping bolt; and
the first clamping member being secured to the second clamping member by the clamping bolt.

4. The digital laser filter device as claimed in claim 1, wherein the occlusion shield is integral with the digital camera.

5. A digital laser filter device comprising:
a digital camera;
a projection arm;
an optic tube;
an occlusion shield;
the digital camera comprising a housing, a zoom assembly, an optics assembly, a display assembly, a microcomputer, an internal power supply, a lens side, and a display side;
the optics assembly further comprising a camera lens;
the display assembly further comprising a display screen;
the lens side comprising a lens opening;
the display side comprising a display opening;
the housing defining a housing cavity;
the lens opening securely receiving the camera lens;
the display opening securely receiving the display screen;
the microcomputer, the zoom assembly, the optics assembly, and the display assembly all being disposed in the housing cavity;
the microcomputer, the zoom assembly, the optics assembly, and the display assembly, wherein some or all, being coupled together in the housing cavity;
the projection arm extending out from the housing;
the projection arm operably receiving the optic tube;
the occlusion shield comprising a coupling tube, a circular base, and an optic tube hole;

the coupling tube being perimetrically connected to the circular base;

the circular base being attached to the display side of the digital camera; and the digital camera and the occlusion shield being configured in an off-axis configuration.

6. The digital laser filter device as claimed in claim 5, wherein the projection arm is integral with the housing.

7. The digital laser filter device as claimed in claim 5 further comprising:

the digital camera comprising a camera body portion and a camera core portion;

the camera body portion comprising at least one detachment button, an attachment ridge, and a first contact;

the camera core portion comprising at least one locking notch, an attachment groove, and a second contact;

the camera core portion being configured to be slidably detachable from the camera body portion;

the attachment groove slidably receiving the attachment ridge;

the first contact and the second contact being intimately engaged;

one of the at least one detachment button and one of the at least one locking notch being aligned when the first contact and the second contact are engaged; and one of the at least one locking notch slidably receiving one of the at least one detachment button to operably secure the camera core portion to the camera body portion.

8. The digital laser filter device as claimed in claim 5 further comprising:

a firearm mount;

the firearm mount being attached to the digital camera;

the firearm mount comprising a first clamping member, a second clamping member, and a clamping bolt; and the first clamping member being secured to the second clamping member by the clamping bolt.

9. The digital laser filter device as claimed in claim 8 further comprising:

the firearm mount comprising a plurality of rail contacts;

the plurality of rail contacts being positioned on a bottom side of the firearm mount;

the plurality of rail contacts being electrically wired to the internal power supply system; and the plurality of rail contacts being coupled to the microcomputer.

10. A digital laser filter device comprising:

a digital camera;

a projection arm;

an optic tube;

a firearm mount;

an occlusion shield;

the digital camera further comprising a housing, a zoom assembly, an optics assembly, a display assembly, a microcomputer, an internal power supply, a lens side, and a display side;

the optics assembly comprising a camera lens;

the display assembly comprising a display screen;

the lens side comprising a lens opening;

the display side comprising a display opening;

the housing defining a housing cavity;

the lens opening securely receiving the camera lens;

the display opening securely receiving the display screen;

the microcomputer, the zoom assembly, the optics assembly, and the display assembly all being disposed in the housing cavity;

the microcomputer, the zoom assembly, the optics assembly, and the display assembly, wherein some or all, being coupled together in the housing cavity;

the projection arm extending out from the housing;

the projection arm operably receiving the optic tube;

the firearm mount being attached to the digital camera;

the firearm mount comprising a first clamping member, a second clamping member, and a clamping bolt;

the first clamping member being secured to the second clamping member by the clamping bolt;

the occlusion shield comprising a coupling tube, a circular base, and an optic tube hole;

the coupling tube being perimetrically connected to the circular base;

the circular base being attached to the display side of the digital camera; and the digital camera and the occlusion shield being configured in an off-axis configuration.

11. The digital laser filter device as claimed in claim 10, wherein the projection arm is integral with the housing.

12. The digital laser filter device as claimed in claim 10 further comprising:

the firearm mount comprising a plurality of rail contacts;

the plurality of rail contacts being positioned on a bottom side of the firearm mount;

the plurality of rail contacts being electrically wired to the internal power supply system; and the plurality of rail contacts being coupled to the microcomputer.

13. The digital laser filter device as claimed in claim 12 further comprising:

the digital camera comprising a camera body portion and a camera core portion;

the camera body portion comprising at least one detachment button, an attachment ridge, and a first contact;

the camera core portion comprising at least one locking notch, an attachment groove, and a second contact;

the camera core portion being configured to be slidably detachable from the camera body portion;

the attachment groove slidably receiving the attachment ridge;

the first contact and the second contact being intimately engaged;

one of the at least one detachment button and one of the at least one locking notch being aligned when the first contact and the second contact are engaged; and one of the at least one locking notch slidably receiving one of the at least one detachment button to operably secure the camera core portion to the camera body portion.

14. The digital laser filter device as claimed in claim 13 further comprising:

a cable port;

a memory card port;

the cable port being disposed in the housing;

the cable port being coupled with the microcomputer;

the memory port being disposed in the housing; and the memory port being coupled with the microcomputer.

* * * * *